United States Patent [19]

Brian

[11] 4,034,402

[45] July 5, 1977

[54] VIDEO SCRAMBLING SYSTEM

[75] Inventor: Jack Brian, Torrance, Calif.

[73] Assignee: Hughes Aircraft Company, Culver City, Calif.

[22] Filed: July 1, 1974

[21] Appl. No.: 484,536

[52] U.S. Cl. .............................. 358/114; 325/144; 358/118; 358/121

[51] Int. Cl.² .......................................... H04N 1/44

[58] Field of Search ............ 178/5.1, 1.5 R; 325/32, 325/138, 144, 145; 358/114, 118, 121

[56] References Cited

UNITED STATES PATENTS

| 1,935,776 | 11/1933 | Hammond, Jr. | 325/65 |
| 3,084,329 | 4/1963 | Clay | 325/65 |
| 3,180,927 | 4/1965 | Heppe et al. | 325/34 |
| 3,500,250 | 3/1970 | Frerking | 325/138 |
| 3,852,519 | 12/1974 | Court | 178/5.1 |
| 3,857,997 | 12/1974 | Toonder | 178/5.1 |
| 3,982,062 | 9/1976 | Simons | 178/5.1 |

Primary Examiner—S.C. Buczinski
Attorney, Agent, or Firm—Don O. Dennison; W. H. MacAllister

[57] ABSTRACT

A system for scrambling and descrambling the video portion of a television signal. At the transmitting end, the video is scrambled by shifting the phase angle of the carrier relative to that of the sidebands a constant amount. At each receiving site, the signal is unscrambled by locally deriving from the phase shifted carrier a carrier of the proper frequency, phase angle and amplitude. The locally generated carrier is then vector summed with the incoming phase shifted carrier to produce a carrier having proper phase angle.

6 Claims, 2 Drawing Figures

VIDEO SCRAMBLING SYSTEM

FIELD OF THE INVENTION

This invention relates to television transmitting and receiving systems and more specifically to a system for transmitting scrambled television programs and unscrambling said programs for reception by conventional television receivers.

DESCRIPTION OF THE PRIOR ART

Many different types of television systems have been proposed for transmitting scrambled television programs which can only be unscrambled by subscribers who either pay or are willing to pay the fee demanded for intelligible reception of the desired television program. Some representative types of scrambling systems are described in the following paragraphs.

U.S. Pat. No. 3,684,823 illustrates a cable television system which may be used for subscription television programs. In this system a low frequency audio pay TV control signal is modulated onto a carrier and sent over the cable along with video and audio TV program information. At any given subscriber receiver the carrier of the control signal is removed, and the audio control signal is used to actuate a control circuit which applies a disabling signal to an IF portion of the receiver under control of the control circuit. This results in a strong beat interference being sent to the picture tube of the subscriber. A subscriber, wishing to view the scrambled subscription TV program, must manually switch out the disabling signal and also activate a timing device to record the subscription viewing time.

Another suggested subscription television system is described in U.S. Pat. No. 3,478,166. In this system a transmitter produces composite video signals with the sync component reduced in amplitude to the grey level. The transmitter also produces program audio and barker audio signals. Sync signal augmenting pulses are generated in two modes, one true and one false, which are randomly interchangeably transmitted over two transmission channels as determined by a control signal, which is transmitted to enable decoding. At a receiver end of the system an attachment enables an ordinary television receiver, by use of the control signal, to select the proper channel for true augmenting pulses which restore the grey level sync pluses to their normal amplitude. Barker audio is provided to the television receiver until the program is properly decoded.

In another suggested subscription television system a television signal is distributed in coded form for use only in subscriber receivers having appropriate decoding apparatus actuated in accordance with coding schedule of the telecast. U.S. Pat. Nos. 2,510,046 and 2,547,598 are examples of this type of system. In this type of system, coding is accomplished by altering some characteristic of the television signal during spaced intervals which may have a duration corresponding to several field-trace intervals and which may have a time separation also corresponding to one or more field-trace intervals.

In the subscription television scrambling system of U.S. Pat. No. 3,242,258, the transmitter includes a circuit for simultaneously transmitting an audio signal of a frequency within the audible frequency range synchronized with the video signal. A transmitter encoder suppresses the horizontal sychronizing signals and replaces them with a key signal so as to distort the video signal transmitted by the transmitter. The transmitter encoder further distorts the video signals transmitted by the transmitter by including a phase shifting circuit for phase shifting and electrical phase of the baseband video signal before transmission. A receiver receives and reproduces the video signal and the key signal, and also reproduces the audio signal in synchronism with the video signal. A receiver decoder reconstitutes the horizontal synchronizing signals from the received key signal so as to nullify the effect of the transmitter encoder and provide in the receiver a video signal including the horizontal synchronizing signals. The receiver decoder further includes a receiver phase shifting circuit for shifting the electrical phase of the detected baseband video signal so as nullify the effect of the transmitter phase shifting circuit. This system is particularly complex in that the shifting of the baseband video phase requires a phase shift network which is capable of shifting the phase of a collage of frequency components a fixed and reproducible amount.

In general, the prior art scrambling systems require modification of the sound and/or baseband video signals to achieve the scrambling affect. Also, most of the prior art unscrambling systems require some internal modification of the viewer's television receiver. Furthermore, since most of the prior art scrambling systems modify some characteristics of the baseband video and/or audio, the process of unscrambling the television signals tends to degrade the signal quality in several ways. In addition, the implementation of prior art television scrambling and unscrambling systems is generally very complex and therefore very expensive.

Accordingly, it is the general object of the present invention to provide a television scrambling and unscrambling system which does not degrade the quality of the television signal.

It is another object of the present invention to provide a television scrambling and unscrambling system which is low in complexity and therefore low in cost.

It is yet another object of the present invention to provide a television scrambling and unscrambling system which requires no internal connections to or modifications of the viewer's television receiver.

It is still another object of the present invention to provide a television scrambling and unscrambling system which does not operate upon or modify the baseband video signal.

SUMMARY OF THE INVENTION

In keeping with the principles of the present invention, the above objects are accomplished by a unique system for scrambling a television program at the transmitting end and for allowing an authorized viewer to unscramble the television program at the receiving end. In a basic embodiment, the scrambling is accomplished at the transmitting end by shifting the phase angle of the RF video a constant amount. At each receiving site, an authorized viewer is provided with a means for deriving from the transmitted phase shifted carrier a new carrier of proper frequency, phase angle, and amplitude. The locally generated carrier is vector summed with the incoming phase shifted carrier to produce a video signal having a carrier of proper phase angle. This signal is then applied to the input of the viewer's conventional television receiver.

As an additional feature of the present invention, means are also provided for transmitting a message along with the television signal from the transmitter end to the receiver end. The message can be used as a means to enable a viewer authorization unit.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENT

Figure 1:
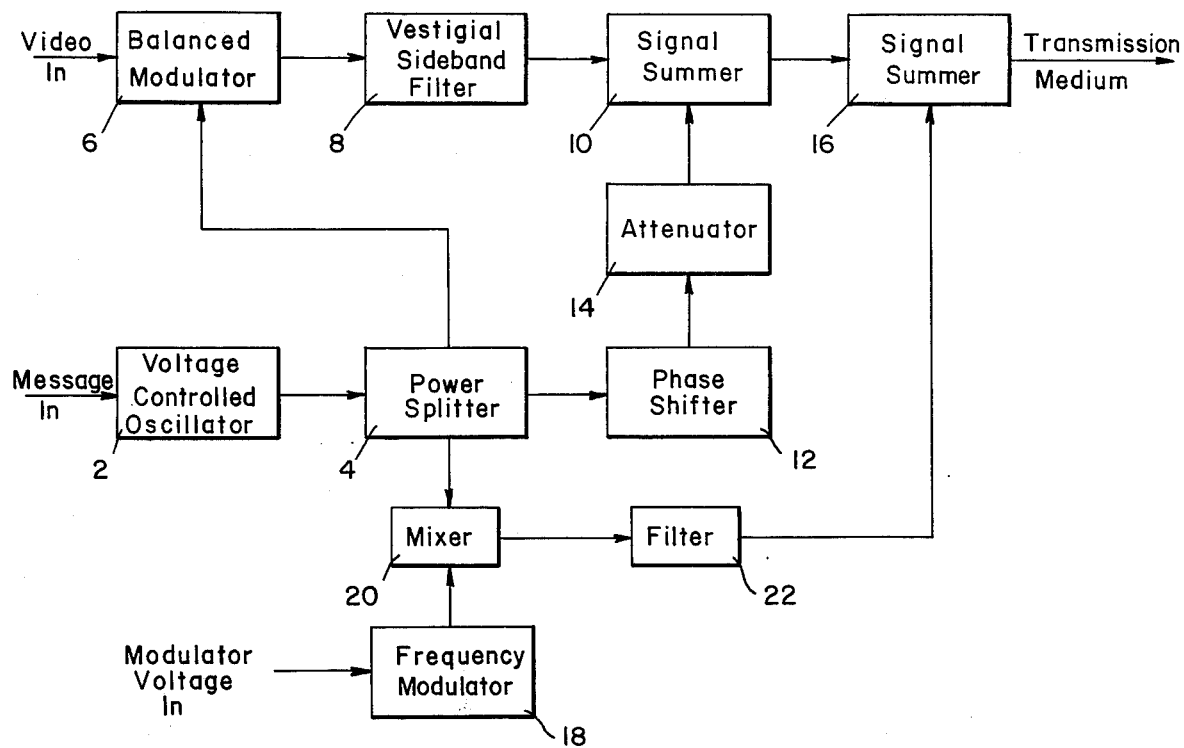
FIG. 1 is a block diagram of a television signal scrambler in accordance with the teachings of the present invention.

Referring more specifically to the drawings, FIG. 1 is a block diagram of a television signal scrambler designed in accordance with the teachings of the present invention.

In FIG. 1, the scrambler includes a voltage controlled oscillator (VCO) 2 having a frequency control port and an output port. A voltage containing specific information, a message, is applied to the frequency control port of VCO 2. The output radio frequency energy of VCO 2 is coupled to the input of power splitter 4. One output of power splitter 4 is coupled to the RF input of balanced modulator 6. The baseband video is also applied to the video input of modulator 6. The output of modulator 6 is coupled to the input of vestigial sideband filter 8. The output of filter 8 is coupled to an input of a first signal summer 10.

Another output of power splitter 4 is coupled to the input of phase shifter 12. The input and output of a variable attenuator 14 are coupled respectively to the output of phase shifter 12 and an input of first summer 10. The output of summer 10 is coupled to an input of a second signal summer 16.

The audio portion of a television signal is applied to the input of frequency modulator 18 in the form of a modulation voltage. The inputs of mixer 20 are connected respectively to an output of power splitter 4 and the RF output of frequency modulator 18. The input and output of filter 22 are resectively to the output of mixer 20 and an input of second summer 16. The output of summer 16 is coupled to a transmission medium which for example can comprise an amplifier feeding an antenna, a coaxial cable distribution network, etc.

In practice, VCO 2 and modulator 18 can comprise any of a number of conventional VCOs or frequency modulators known in the art and having the following characteristics: The VCO must be capable of operating at conventional television frequencies and have a peak deviation of at least 5 Khz. The frequency modulator must have an output center frequency of 4.5 Mhz and a peak deviation of 25 Khz. Filter 8, mixer 20, and filter 22 are also standard devices which are well known in the art. For example, balanced modulator 6 can be a Merrimack DM-1-250 device. Power splitter 4, and signal summers 10 and 16 can be Merrimac PD-20-110 devices. Also, the phase shifter 12 can comprise a length of coaxial transmission line or a transformer depending on the application. Attenuator 14 can be a Kay Electric variable attenuator.

In operation, the output RF signal from VCO 2 is applied to the RF input of balanced modulator 6 via power splitter 4. Preferably, the normal output frequency of VCO 2 corresponds to one of the commercial television video carrier frequencies. Balanced modulator 6 amplitude modulates the baseband video upon the RF signal from the power splitter 4 and produces a double sideband, suppressed carrier signal as its output. The output signal is then passed through vestigial sideband filter 8 to remove a portion of the unwanted sideband. The vestigial sideband, suppressed carrier signal from filter 8 is applied to one input of the first signal summer 10.

Furthermore, a portion of the output RF signal from VCO 2 is applied to the imput of phase shifter 12 via power splitter 4. Phase shifter 12 shifts the phase angle of the RF signal a constant amount. The phase shifted RF signal from phase shifter 12 passes through attenuator 14 and is applied to an input of first signal summer 10. This phase shifted RF signal is combined in first summer 10 with the vestigial sideband, suppressed carrier signal to form a television video signal, wherein the phase shifted RF signal is the carrier. The level of the carrier is set to a preselected amplitude by attenuator 14.

The amount of phase shift performed by phase shifter 12 may be any constant amount. Working systems have been implemented using both 90° and 180° phase shifts. Since the video quality is substantially insensitive to small phase angle changes when the 180° phase shift is utilized, the 180° phase shift is preferred over any other. The previous discussion is only for illustration and the present invention works equally well with any constant amount of phase shift.

Frequency modulator 18, mixer 20, and filter 22 provide a means for generating a frequency modulated audio carrier. Frequency modulator 18 includes a source of RF energy upon which the audio is modulated. Therefore, frequency modulator 18 generates a frequency modulated RF signal with a center frequency of 4.5 Mhz and a maximum peak deviation of 25 Khz. Mixer 20 mixes a portion of the RF signal from VCO 2 and the frequency modulated RF signal from modulator 18 to form two output signals with center frequencies equal to the output frequency of VCO 2 plus and minus 4.5 Mhz. Filter 22 selects the higher frequency of the two output signals and applies said selected signal to an input of second signal summer 16.

Signal summer 16 combines the video signal from first summer 10 and the frequency modulated audio signal from filter 22 to form a complete television signal both audio and video components and a carrier whose phase angle has been shifted.

As an additional feature of the present invention, a means at the transmitter end for transmitting a message along with the completed television signal is provided. This is accomplished by applying the message in the form of a time varying voltage to the frequency control port of VCO 2 thereby frequency modulating the message onto the complete television signal. Frequency modulating the message onto the complete television signal allows the message to be transmitted along with the television signal without substantially increasing the actual bandwidth. Futhermore, since the video envelope detector does not respond to frequency modulation, the received video signal is neither degraded nor interfered with. Also, since the complete television signal is frequency modulated, the difference frequency between the video carrier frequency and audio carrier frequency is a constant thereby avoiding interference with the audio in conventional television receivers that use the "intercarrier" method of deriving the audio IF.

The complete television signal, which appears at the output of second signal summer 16, having the message frequency modulated thereon is coupled to the transmission media. As previously mentioned, the transmission media can be an amplifier, an antenna, or a complete CATV system.

Furthermore, it should be apparent to those skilled in the art that at least one other embodiment of above described scrambler could be implemented. In such a scrambler, a standard video modulator would be used to generate a double sideband video signal having a RF carrier. To perform the scrambling function, a second RF carrier whose phase angle is shifted relative to the RF carrier of the video signal is generated. The phase shifted RF carrier is vector summed with the video signal. Therefore, the output television video signal is a signal having a carrier whose phase angle is shifted, thereby scrambling the television video signal.

Figure 2:
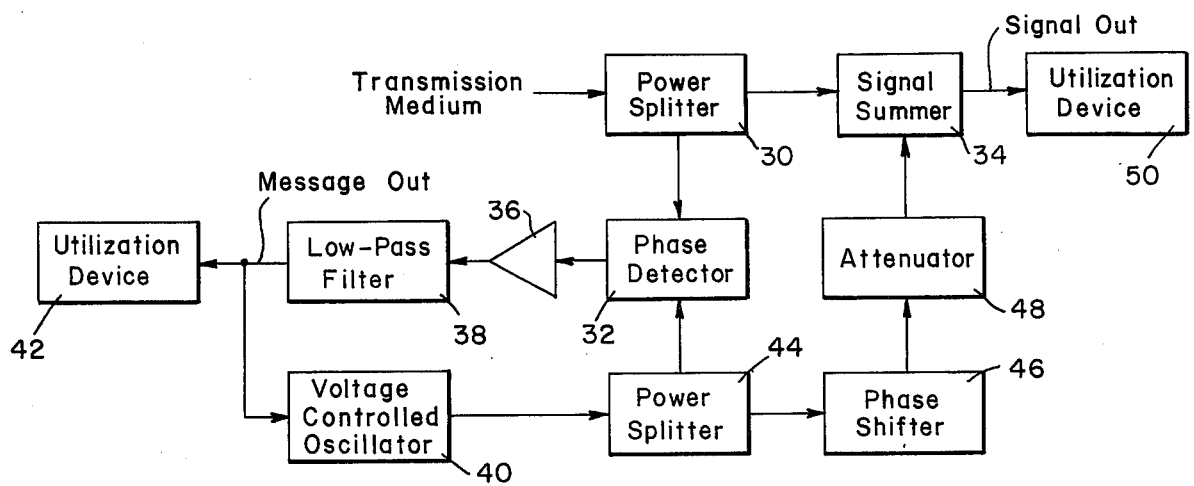
FIG. 2 is a block diagram of a television signal unscrambler in accordance with the teachings of the present invention.

Referring now to FIG. 2, the unscrambler includes a power splitter 30 with an input and at least two outputs. The input of splitter 30 is coupled to the transmission medium. The two outputs of splitter 30 are coupled respectively to phase detector 32 and signal summer 34. The output of phase detector 32 is coupled to the input of amplifier 36. The output of amplifier 36 is coupled to the input of low-pass filter 38. The output of filter 38 is coupled to the frequency control port of voltage controlled oscillator (VCO) 40. The output of filter 38 is also coupled to utilization device 42.

The RF output of VCO 40 is coupled to the input of a power splitter 44. The two outputs of splitter 44 are, in turn, coupled to the other input of phase detector 32 and the input of phase shifter 46, respectively. The output of phase shifter 46 is coupled through a variable attenuator 48 to the input of signal summer 34. The output of summer 34 is coupled to utilization device 50.

In practice, the particular individual devices can comprise any of a number of conventional devices known in the art. Power splitter 30, signal summer 34, and power splitter 44 can be a Merrimac PD-20-110. Phase detector 32 can be a Merrimac DM-1-250. The function performed by amplifier 36 and low-pass filter 38 can be performed by a single low-pass amplifier having a cut-off frequency of 200 hz. Attenuator 48 can be a Kay Electric variable attenuator. VCO 40 is a voltage controlled oscillator with similar characteristics as previously described for VCO 2. Also, phase shifter 46 can be a length of coax cable or a transformer depending upon the application.

In operation, the complete television signal having the message frequency modulated thereon is coupled from the transmission medium to the input of power splitter 30. A portion of the complete television signal with message is applied to an input of phase detector 32 via power splitter 30. That portion of the block diagram comprising phase detector 32, amplifier 36, low-pass filter 38, VCO 40, and power splitter 44 acts as a phase lock loop. Said phase lock loop locks the phase angle and frequency of the incoming carrier.

The output RF signal of VCO 40 is also coupled via power splitter 44 to the input of phase shifter 46. Phase shifter 46 shifts the phase angle of the applied RF signal an amount substantially equal and opposite to that of phase shifter 12 contained in the scrambler. The output RF signal from phase shifter 46 is then passed through attenuator 48 and applied to an input of signal summer 34. Attenuator 48 is varied such that the level of the RF signal applied to signal summer 34 is some preselected ratio of the amplitude of the phase shifted carrier of the complete television signal which is applied to the other input of summer 34. The two signals are vector summed by signal summer 34, thereby producing an unscrambled television signal with a carrier having proper phase angle. The unscrambled television signal is then coupled to utilization device 50. Said utilization device 50 can be a conventional television receiver.

As an additional feature of the present invention, a means is provided at the receiving end for recovering the message that is frequency modulated upon the complete television signal at the transmitter end. The means for recovering the message is an integral part of the phase lock loop portion of the unscrambler. Since VCO 40 is phase and frequency locked to the incoming television signal, the amplitude of the signal appearing at the frequency control port of VCO 40 varies in response to the frequency and phase changes of the complete television signal carrier. Therefore, the amplitude variations of the signal at the control port duplicates the frequency deviation of the incoming television signal carrier containing the message, thereby generating a time varying signal which is a duplicate of the transmitted message. The recovered message is coupled to a utilization device such as a viewer authorization unit.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the present invention.

What is claimed is:

1. A system for producing a scrambled television signal, comprising:
   a variable frequency source of radio frequency carrier wave energy for receiving a time varying signal and producing a frequency-modulated radio frequency carrier;
   balanced modulator means for amplitude modulating video information upon said frequency-modulated radio frequency carrier to produce a frequency and video amplitude modulated, suppressed carrier television signal;
   phase shift means responsive to said frequency-modulated radio frequency carrier for producing a phase-shifted, frequency-modulated, radio frequency carrier; and
   means for combining said suppressed carrier television signal with said phase-shifted, frequency-modulated radio frequency carrier to produce a scrambled television signal having a phase-shifted radio frequency carrier which is frequency and video amplitude modulated.

2. Apparatus as set forth in claim 1 wherein said system for producing a scrambled television signal comprises additionally:
   audio carrier generating means receiving said frequency-modulated carrier and including an audio signal controlled frequency modulator for producing an audio frequency-modulated carrier signal; and means for combining said scrambled television signal with said audio frequency-modulated carrier signal to produce a scrambled television signal in which said time varying signal is frequency-modulated in both the video and audio portions of said scrambled television signal.

3. A television signal system comprising:

a transmitting system having:

means for producing a frequency-modulated carrier which is frequency-modulated in accordance with a predetermined message;

video modulating means receiving said frequency-modulated carrier for producing a frequency-modulated and video amplitude modulated, suppressed video carrier television signal;

phase shift means responsive to said frequency-modulated carrier for producing a frequency-modulated, phase-shifted carrier;

signal combining means responsive to said suppressed video carrier television signal and to said phase-shifted, frequency-modulated carrier for producing a scrambled television signal having a phase-shifted video carrier which is frequency and amplitude modulated;

a receiving system having:

circuit means including a phase lock loop responsive to said scrambled television signal for producing a phase-shifted radio frequency signal having a phase and amplitude to unscramble said scrambled television signal;

means for combining said phase-shifted radio frequency signal with said scrambled television signal to produce an unscrambled television signal;

said phase lock loop functioning additionally as a frequency discriminator to demodulate the frequency-modulated component of said video carrier for producing a signal indicative of said message.

4. A television signal system comprising:

a transmitting system having:

means for producing a frequency-modulated carrier which is frequency-modulated in accordance with a predetermined message;

video modulating means receiving said frequency-modulated carrier for producing a frequency-modulated and video amplitude modulated, suppressed video carrier television signal;

phase shift means responsive to said frequency-modulated carrier for producing a frequency-modulated, phase-shifted carrier;

signal combining means responsive to said suppressed video carrier television signal and to said phase-shifted, frequency-modulated carrier for producing a scrambled television signal having a phase-shifted video carrier which is frequency and amplitude modulated;

a receiving system having:

a phase lock loop including a phase detector responsive to said scrambled televison signal, a low pass filter responsive to the output of said phase detector, and a voltage-controlled oscillator responsive to the output of said low pass filter and having an output coupled to said phase detector, said phase lock loop at the output of said voltage-controlled oscillator producing a radio frequency signal having a frequency and phase corresponding to the frequency and phase of said phase-shifted video carrier, said phase lock loop further demodulating the frequency-modulated component of said phase-shifted video carrier at the output of said low pass filter to produce a signal indicative of said message;

phase shift means responsive to said radio frequency signal for producing a phase-shifted radio frequency signal of phase and amplitude to unscramble said scrambled television signal; and signal combining means for combining said phase-shifted radio frequency signal with said phase-shifted carrier of said scrambled television signal for producing an unscrambled television signal.

5. In a television communication system, a method of scrambling a video signal in a non-degrading manner to prevent unauthorized utilization of the video information and for utilizing the video carrier for transmitting information other than video information, comprising the steps of:

generating a video carrier;

utilizing said video carrier to produce a frequency-modulated video carrier, modulated in accordance with a predetermined message;

video amplitude modulating and suppressing one portion of said frequency-modulated video carrier to produce a frequency and video amplitude modulated, suppressed carrier video signal;

utilizing another portion of said frequency-modulated video carrier to produce a phase-shifted, frequency-modulated video carrier; and combining said frequency and video amplitude modulated suppressed carrier video signal with said phase-shifted, frequency-modulated video carrier to produce a scrambled video signal.

6. In a television communication system, a method of scrambling a television signal in a non-degrading manner to prevent unauthorized utilization of the video information and for utilizing the video carrier for generating an audio carrier and for transmitting message information other than video information, comprising the steps of:

generating a carrier signal;

frequency-modulating said carrier signal in accordance with a predetermined message;

dividing the frequency-modulated carrier signal to provide a plurality of frequency-modulated carrier signals;

utilizing a first frequency-modulated carrier signal to produce a frequency and video amplitude modulated, suppressed carrier video signal;

utilizing a second frequency-modulated carrier signal to produce a phase-shifted frequency-modulated carrier signal;

combining said frequency and video amplitude modulated suppressed carrier video signal with said phase-shifted frequency modulated carrier to produce a scrambled video signal;

utilizing a third frequency-modulated carrier signal to produce an audio frequency-modulated carrier signal; and combining said scrambled video signal with said audio frequency-modulated carrier signal to produce a scrambled television signal in which said message is frequency-modulated in both the video and audio portions of said scrambled television signal.

* * * * *